United States Patent
Oliveira et al.

(10) Patent No.: US 9,348,801 B2
(45) Date of Patent: May 24, 2016

(54) SYSTEM AND METHOD FOR AUTOMATIC PAGE LAYOUT

(75) Inventors: João Batista Sousade Oliveira, Porto Alegre (BR); Isabel H. Manssour, Porto Alegre (BR); Ricardo Farias B. Piccoli, Canoas (BR); Alexandre K. Seki, Viamao (BR); Mauricio S. Klein, Nova Santa Rita (BR)

(73) Assignees: HP Brasil LTDA (BR); Pontificia Universidads Catolica Do Rio Grande Do Sul (BR)

( * ) Notice: Subject to any disclaimer, the term of this patent is extended or adjusted under 35 U.S.C. 154(b) by 1171 days.

(21) Appl. No.: 12/853,699

(22) Filed: Aug. 10, 2010

(65) Prior Publication Data

US 2012/0042240 A1 Feb. 16, 2012

(51) Int. Cl.
  *G06F 17/00* (2006.01)
  *G06F 17/21* (2006.01)

(52) U.S. Cl.
  CPC .................... *G06F 17/212* (2013.01)

(58) Field of Classification Search
  CPC .................................. G06F 17/212
  USPC .......................... 715/210, 243, 256
  See application file for complete search history.

(56) References Cited

U.S. PATENT DOCUMENTS

| | | | |
|---|---|---|---|
| 5,381,523 A * | 1/1995 | Hayashi ................. | 715/204 |
| 5,553,217 A * | 9/1996 | Hart et al. ............... | 715/210 |
| 5,845,303 A * | 12/1998 | Templeman ............ | 715/255 |
| 6,757,073 B1 | 6/2004 | Kuroda | |
| 6,826,727 B1 * | 11/2004 | Mohr et al. ............. | 715/235 |
| 6,934,052 B2 * | 8/2005 | Venable ................... | 358/1.18 |
| 7,337,394 B2 * | 2/2008 | Nitta et al. .............. | 715/210 |
| 7,340,676 B2 | 3/2008 | Geigel et al. | |
| 7,496,839 B2 * | 2/2009 | Duxbury ................. | 715/243 |
| 7,555,730 B2 | 6/2009 | Atkins | |
| 7,752,553 B2 | 7/2010 | Pennington et al. | |
| 7,770,111 B2 * | 8/2010 | Burago et al. ........... | 715/256 |
| 7,856,345 B2 * | 12/2010 | Christensen et al. .... | 703/4 |
| 2002/0051208 A1 * | 5/2002 | Venable ................... | 358/1.18 |
| 2002/0095439 A1 * | 7/2002 | Long et al. ............... | 707/507 |
| 2003/0095135 A1 * | 5/2003 | Kaasila et al. ........... | 345/613 |
| 2006/0236230 A1 * | 10/2006 | Lin et al. ................. | 715/517 |
| 2007/0006072 A1 * | 1/2007 | Purvis ...................... | 715/517 |
| 2008/0094420 A1 | 4/2008 | Geigel et al. | |
| 2008/0320386 A1 * | 12/2008 | Balzano et al. .......... | 715/256 |
| 2009/0309894 A1 | 12/2009 | Lam et al. | |

* cited by examiner

*Primary Examiner* — Scott Baderman
*Assistant Examiner* — Howard Cortes
(74) *Attorney, Agent, or Firm* — Brooks, Cameron & Huebsch, PLLC (57) ABSTRACT

The present disclosure includes a system and method for automatic page layout. One automatic page layout method includes dividing a plurality of ordered graphical items into groups, and bisecting a space into regions having a reading order corresponding to an order of the ordered graphical items, each region corresponding to one of the groups and being sized according to a first layout characteristic of the ordered graphical items of the region's corresponding group in proportion to a second layout characteristic of the plurality of ordered graphical items. An output is caused in which each region has been filled with that region's associated group of ordered graphical items.

20 Claims, 4 Drawing Sheets

SYSTEM AND METHOD FOR AUTOMATIC PAGE LAYOUT

BACKGROUND

The amount and use of digital content is increasing, including text and/or images, and combinations thereof. Digital content can be displayed electronically, such as by a computer monitor, television, or mobile device, or printed to physical print media, such as a newspaper, magazine, or single paper sheet. Digital content can include an arrangement of items that are arranged and presented to a user in many different formats, such as by a webpage, in a newspaper or magazine, blog, e-mail listing, photo album, among others. Displaying digital content can involve page layout decisions regarding placement of text and images on a page, including their relationship to one another.

DETAILED DESCRIPTION

The present disclosure includes a system and method for automatic page layout. One automatic page layout method includes dividing a plurality of ordered graphical items into groups, and bisecting a space into regions having a reading order corresponding to an order of the ordered graphical items, each region corresponding to one of the groups and being sized according to a first layout characteristic of the ordered graphical items of the region's corresponding group in proportion to a second layout characteristic of the plurality of ordered graphical items. An output is caused in which each region has been filled with that region's associated group of ordered graphical items.

Some digital content presentations organize the digital content to convey certain information based on the relative positioning of individual items. For example, an email listing can be arranged for presentation in chronological order, which conveys to a user the relative age of a particular entry to another based on their relative positions. A user can take advantage of the relative positioning information in searching for a particular message.

Blog entries can also make use of information communicated to a user based on relative positioning. For example, a blog may have an author's entry, followed by chronological comments from readers regarding the author's entry. The chronological comments from readers can also include comments to previous comments. Therefore, presenting the blog entries and comments based on a chronological ordering enables a reader to read the author's entry and readers' posts in chronological order in a way that earlier entries provide the necessary context for later entries. Other ordering schemes (e.g., according to geographical location of the author/reader) may not provide the reader with the necessary context.

Many western cultures structure language in a left-to-right and top-to-bottom fashion. That is, sentences are conventionally read left-to-right, from the top of a page, and progressing to the bottom of the page. Readers have developed an expectation as a result, that other presentations of text and images are similarly organized (e.g., left-to-right and top-to-bottom). For example, readers tend to expect multiple-column articles to be organized on a page such that a column on a left is to be read from top to bottom before reading an adjacent column to the right. The same expectation can apply to images as well. For example, the frames of cartoons in a newspaper are typically arranged to be viewed one after another progressing from left to right and top row to bottom row, even if the cartoon contains no text.

Some digital content, such as newspapers or web pages, may also assume a reader reads a page according to the left-to-right and top-to-bottom convention. For example, more important stories may be placed near the top of a page to draw more attention. Related articles may be placed in proximity to one another, for example, with a main (e.g., general) story being located so as to likely be read before a story concerning a more detailed aspect of the main story. Even without the need to convey information based on relative positioning of digital content items, an artist or editor may wish to have their work presented so as to maintain the ordering of the digital content items they have established.

Subscribing to web site syndication feeds is a popular mechanism for users to receive information about certain topics and/or web pages in an efficient manner. The syndication data is available to syndication-aware programs that subscribe to a "feed" of the syndication data. The syndication data is typically designed to be machine-readable for efficient processing (e.g., into human-readable form). For example, the syndication data is typically XML-based or otherwise structured to ensure or enhance the machine-readability. A typical use of syndication data is by subscription via a syndication feed aggregation service, which combines the contents of one or more syndication feeds for display on a single screen or series of screens. Syndication data can be received serially for simultaneous display (e.g., on a same page). Examples of syndication data include data formatted according to standards such as RSS and Atom. The aggregated event stream can indicate events, such as information originating from an Internet web feed (e.g., a RSS feed), and so page layout of items comprising the aggregated event stream can be important.

Computer software can be adapted for arranging text and images according to the user's direction. For example, software can be used to manually place and arrange stored images, such as photographs, video frames, and blocks of text, on a page (e.g., a webpage, a printer output, a display). For example, web page design programs and word processing program can include such capabilities. However, such programs typically enable a user to place images and text as they direct. Other computer software, such as e-mail packages and personal web page design software, can allow a user to designate areas to display received digital content. For example, a user may designate a portion of an e-mail program within which to display received e-mail messages, or may design a personal web page to display streaming news articles received from selected sources within one area of a page, streaming blog entries of interest to display in another area of the same page, and streaming movies to display in yet another area. These programs often use a standard template or require a user's input to set the various areas. As such, they do not constitute an automated page layout.

Figure 1:
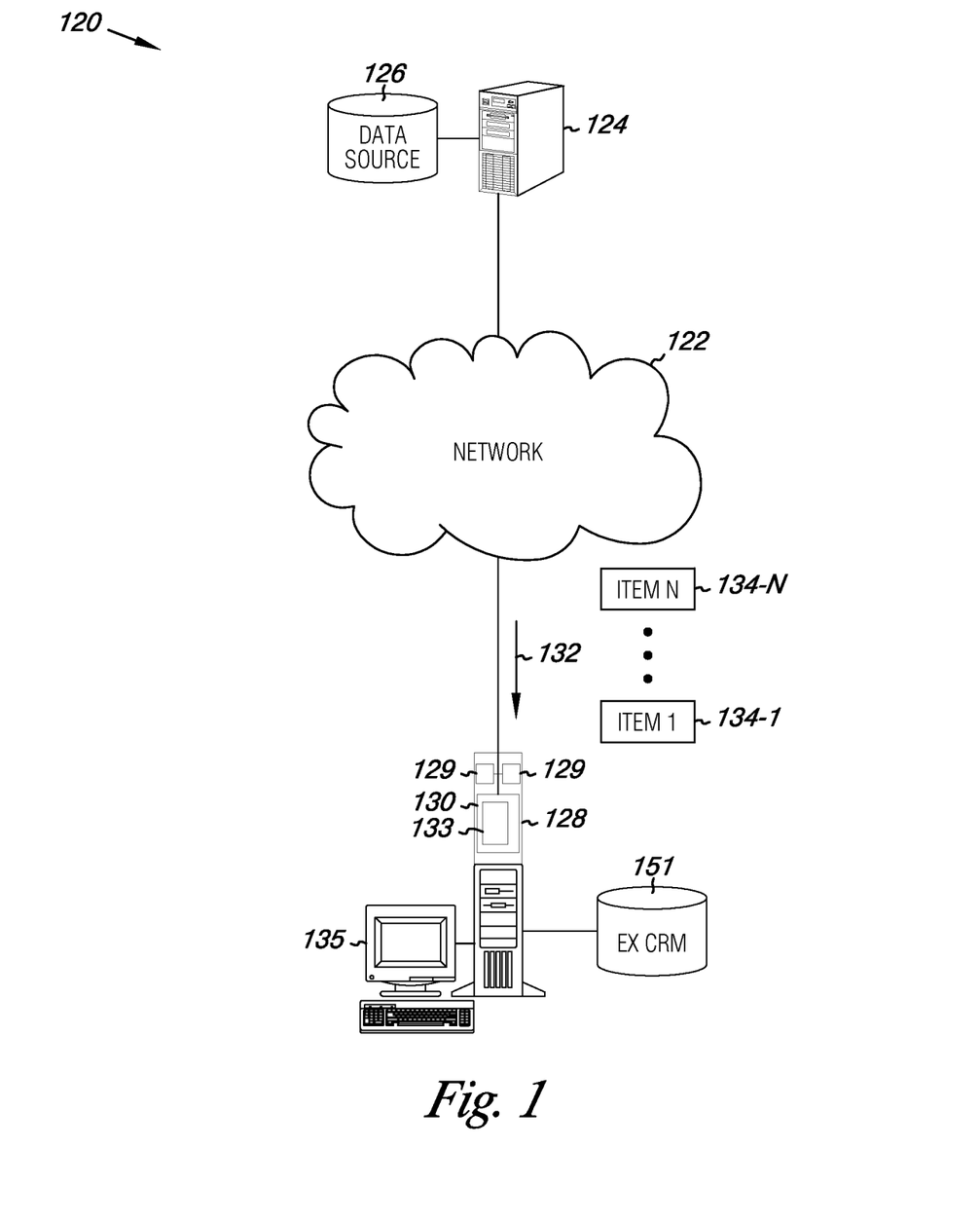
FIG. 1 is a diagram illustrating a computing system according to an example of the present disclosure.

FIG. 1 is a diagram illustrating a computing system according to an example of the present disclosure. The computing system 120 shown in FIG. 1 is a networked computing system. The network 122 can be a private network such as a local area network or wide area network, or can be a public network, such as the Internet. However, examples of the present disclosure are not limited to a particular computing system configuration.

The computing system 120 can be comprised of a number of computing resources communicatively coupled to the network 122. FIG. 1 shows a server 124 having a data source 126, and a client 128. Server 124 and client 128 are computing devices. Client 128 includes one or more processors 129 communicatively coupled to a non-transitory computer-readable medium 130. The non-transitory computer-readable medium 130 is structured to store one or more programs 133 that are executed by the one or more processors 129 and/or data.

Client 128 is further communicatively coupled to a production device 135 (e.g., electronic display, printer, etc.). Client 128 can also be communicatively coupled to an external computer-readable memory 130. The client 128 can cause an output to the production device 135, for example, as a result of executing instructions of one or more programs stored non-transitory computer-readable medium 130, by at least one processor 129, to implement a method of automatic page layout according to the present disclosure. Causing an output can include, but is not limited to, displaying text and images to an electronic display and/or printing text and images to a tangible medium (e.g., paper). For example, a plurality of text articles and images, with or without captions, can be arranged to appear in an arrangement similar to a newspaper or magazine and caused to be output to a computer monitor or printed to a tangible medium.

Server 124 and client 128 are communicatively coupled to one another through the network 122. While a single server is shown in FIG. 1, the computing system can be comprised of multiple interconnected computing resources, such as servers 124 and clients 128. A computing resource (e.g., 124, 128) can include control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g., 126, 130). The non-transitory computer-readable medium 126 can be integral, or communicatively coupled, to a computing resource such as client 128, in either in a wired or wireless manner. For example, the non-transitory computer-readable medium 130 can be an internal memory, a portable memory, a portable disk, or a memory located internal to another computing resource (e.g., enabling the computer-readable instructions to be downloaded over the Internet). The non-transitory computer-readable medium 130 can have computer-readable instructions stored thereon that are executed by the control circuitry (e.g., processor) to provide a particular functionality.

The non-transitory computer-readable medium 130, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium 130 can include optical discs, digital video discs (DVD), high definition digital versatile discs (HD DVD), compact discs (CD), laser discs, and magnetic media such as tape drives, floppy discs, and hard drives, solid state media such as flash memory, EEPROM, phase change random access memory (PCRAM), as well as other types of machine-readable media.

FIG. 1 further illustrates a the client 128 receiving a stream 132 of digital content containing a plurality of graphical items (e.g., 134-1, . . . , 134-N). The plurality of graphical items (e.g., 134-1, . . . , 134-N) have a particular order (e.g., from 1 to N). The plurality of graphical items (e.g., 134-1, . . . , 134-N) may be received in the order, or may be received out of order but including an indication of the order so that the items may be ordered by the client 128 after receipt thereof.

The plurality of graphical items (e.g., 134-1, . . . , 134-N) may have been stored on the data source 126, and requested by client 128 from server 12, such as by requesting the content of a web page, newspaper page, book, or similar digital content. The plurality of graphical items (e.g., 134-1, . . . , 134-N) may have been generated by one or more computing devices (e.g., server 124) and copied to client in near real time, such as via an RSS feed where the ordering is chronological as determined from a time stamp accompanying the item.

The item of digital content may be a graphical item, such as text and/or images. A graphical item is a discrete quantity of digital content, for example, a news article with or without a headline, or an image with or without a caption. A sequence of graphical items (e.g., a plurality of graphical items having an order) may be received at the client 128 shown in FIG. 1 for display electronically or physically on one or more pages. Depending on the quantity of graphical items, the plurality of graphical items can be arranged into a large number of different arrangements or display electronically or physically on one or more pages. Many such arrangements do not provide a reading order corresponding to the order of the sequence of graphical items (e.g., received order, designated order).

Figure 2:
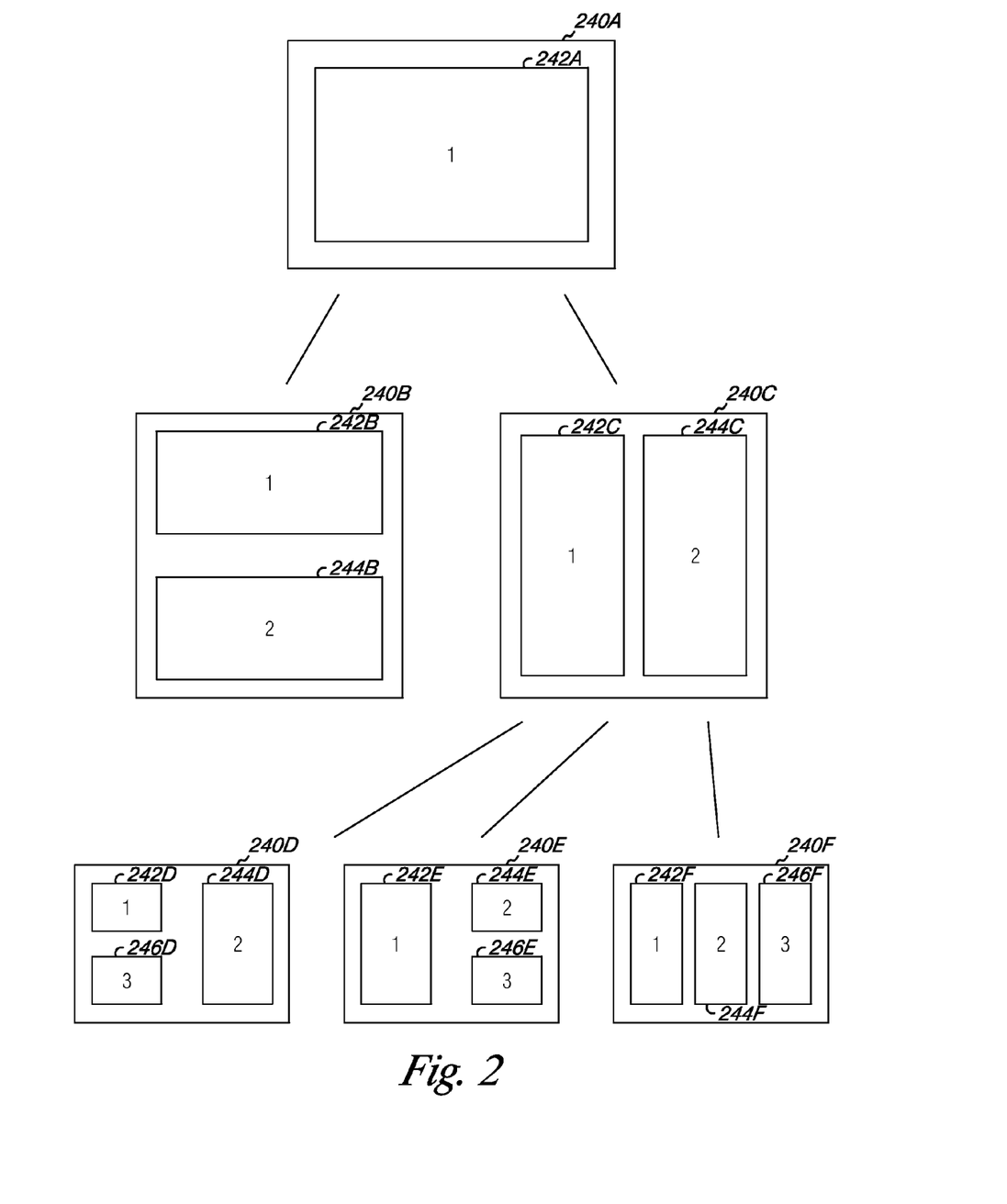
FIG. 2 is a diagram illustrating recursive page bisecting according to an example of the present disclosure.
Figure 3:
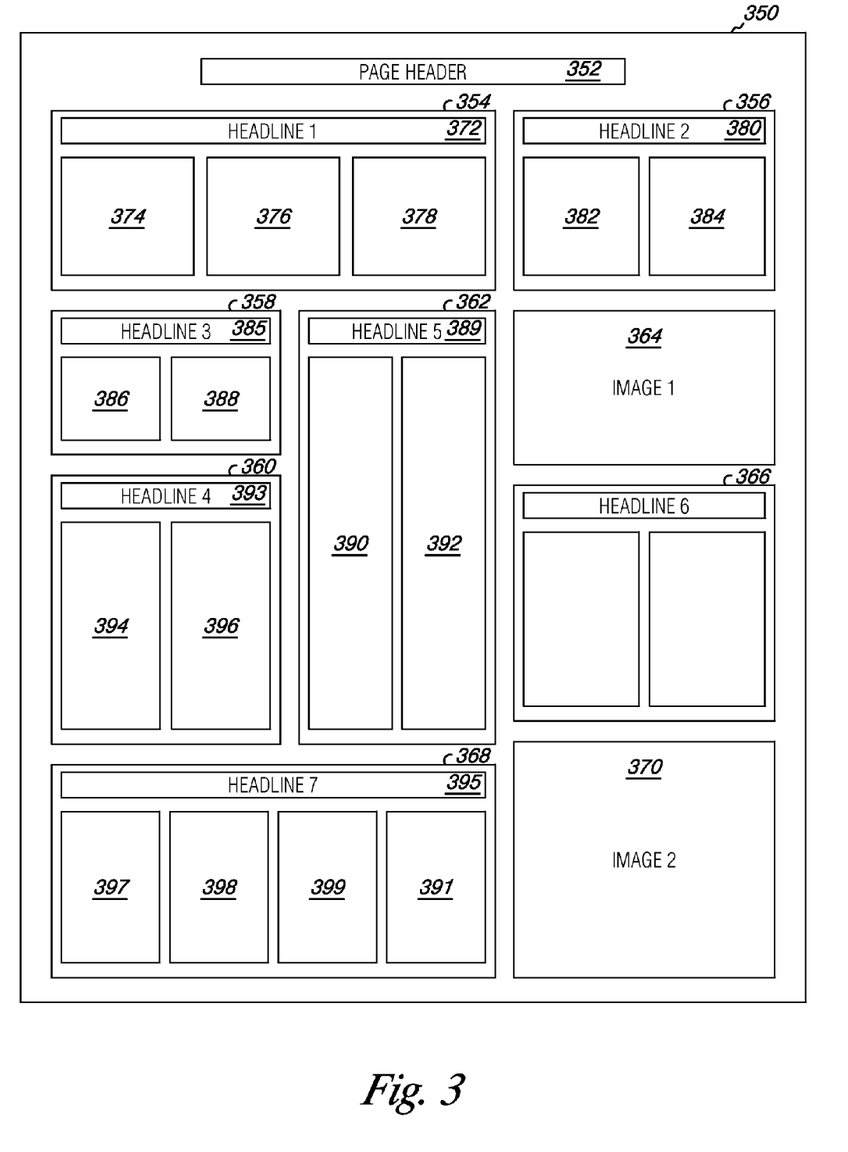
FIG. 3 is a diagram illustrating a page layout according to an example of the present disclosure.

The present disclosure addresses the problem of automatically placing document items on pages of some output device by bisecting the page into regions where each item is to be placed. According to example embodiments, the page can be divided into columns, with the graphical items positioned in the columns according to an order, such as in a newspaper-type arrangement. Dividing the page into various regions (e.g., columns) provides the advantage of allowing for a wide range of publications (e.g., designed to be arranged in such a format) to be produced. Publications where a page is not divided into columns can easily be simulated by defining areas for each graphical item that do not necessarily correspond to a column layout. FIGS. 2 and 3 illustrate examples of automatic page layout in accordance with the present disclosure that include both column arrangements and non-column arrangements. FIGS. 2 and 3 are discussed further below.

According to an example method of the present disclosure for automatic page layout is based on a "divide and conquer" approach. For example, a client computing device (e.g., FIG. 1 at 128) may receive information defining a page width and height, and a list of graphical elements to be placed, and optionally an indication of a percentage of the total page space that is recommended to be allocated to each graphical item. Through consecutive bisections, the space of the page can be divided into regions in an attempt to allocate the recommended portions of the space within which to display each graphical item.

FIG. 2 is a diagram illustrating recursive page bisecting according to an example of the present disclosure. FIG. 2 shows a space 240A having one region 242A. Bisection of a region can be made by a horizontal or vertical sectioning, dividing the region into two new regions. A region can be bisected in two different ways to achieve two different results. For example, space 240B reflects region 242A being bisected horizontally into a first horizontal region 242B and a second horizontal region 244B, while space 240C reflects region 242A being bisected vertically into a first vertical region 242C and a second vertical region 244C.

Bisection of one (or both) regions of spaces 240B and 240C can continue (e.g., recursively) to create additional regions having different configurations, sizes and positions. For example, space 240D reflects region 242C being bisected horizontally (and region 244C not being bisected) resulting in a first region 242D, a second region 244D, and a third region 246D. Space 240E reflects region 244C being bisected horizontally (and region 242C not being bisected) to result in a first region 242E, a second region 244E, and a third region 246E, that provides a different arrangement than that indicated for space 240D. Space 240F reflects one of regions 242C or 244C being bisected vertically to result in a first region 242F, a second region 244F, and a third region 246F, that provides different region configurations and relative positioning than either of the arrangements provided for spaces 240D or 240E.

Other bisections than those illustrated in FIG. 2 could be additionally or alternatively made. For example, region 244D could be bisected to provide 4 regions in space 240D, or region 244F could be bisected to provide 4 regions in space 240F. It can be appreciated from the bisection examples illustrated by FIG. 2 that recursive bisection can be used to configure a space in many different ways, including various sized regions positioned as desired within the space.

As mentioned, graphical items can be displayed within the regions. For example, all the graphical items could be displayed in a space (e.g., a page) having a single region. Alternatively, half of the graphical items could be displayed in each region of a space bisected into two regions. Embodiments of the present disclosure are not limited to any particular quantity of graphical items corresponding to a particular region, and equal numbers of graphical items need not be displayed in each regions, for at least because the regions could be of different size and/or the graphical items may involve more or less text, or larger or smaller images than other graphical items.

However, according to the present disclosure, as portions of the space (e.g., regions) are bisected, the plurality of ordered graphical items is also divided into groups of graphical items, with each group corresponding to a region. Bisecting the portions of the space and dividing the plurality of ordered graphical items can occur simultaneously, or without any intentional delay (e.g., substantially simultaneously, or at different times.

FIG. 3 is a diagram illustrating a page layout according to an example of the present disclosure. The page layout illustrated in FIG. 3 was determined according to the method of the present disclosure. The page layout is briefly discussed first, followed by a further discussion of the methods used to arrive at a particular page layout.

Page 350 (e.g., space) includes multiple regions, including a first region 354, a second region 356, a third region 358, a forth region 360, a fifth region 362, a sixth region 366, a seventh region 368, and regions for each of image 1 364 and image 2 370. The page header 352 can also be considered a region. The automatic page layout method attempts to use all available space on a page; however, regions need not occupy the entire space 350. That is, for readability regions can be separated from each other and/or the edge of the space by a margin. To avoid very wide or narrow regions, minimum and maximum aspect ratios can be specified (e.g., given with the sequence of graphical items as input), and an automatic page layout solution is only acceptable when all regions have aspect ratios within those bounds. Such constraints assure that areas containing text are not too wide on the page or too narrow.

Regions can be further partitioned into areas such that multiple graphical items could be arranged within a particular region. For example, the first region 354 is partitioned into four areas, 372, 374, 376, 378 to accommodate 4 graphical items (e.g., an article headline, an article first portion, and article second portion, and an article third portion) where the headline and portions of a same article are received as discrete graphical items.

However, more usual, a graphical item will comprise an entire article, including a headline and a body. A region can then include a single area equivalent to the region, and the area can be further partitioned into sub-areas. For example, an area can be further partitioned into a headline sub-area and one or more column sub-areas. A headline of the article can be associated with and displayed in the headline sub-area, and the body of an article can be associated with and displayed across the column sub-areas. For example, second region 356 can include (i.e., is equivalent to) one area which can be further partitioned into a second headline area 380 and two column areas 382 and 384. Each of the third, forth, fifth, and sixth regions (e.g., 358, 360, 362, 366 and 368 respectively) can include (i.e., is equivalent to) one area which can be further partitioned into a headline area (e.g., 385, 393, 389) and two column areas (e.g., 386/388, 394/396, 390/392). Seventh region 368 can include (i.e., is equivalent to) one area which can be further partitioned into a seventh headline area 395 and four column areas 397, 398, 399 and 391, as shown.

The regions associated with image 1 (e.g., 364) and image 2 (e.g., 370) can include (i.e., is equivalent to) one area which is not further partitioned. However, regions associated with a graphical item that includes an image could be further partitioned, for example into an image sub-area and a caption sub-area.

The regions are positioned on in the space in a reading order that maintains the order of the plurality of graphical items as between groups. The approach of the present disclosure endeavors to preserve a reading order provided by the input, as it can be important that content be provided in a designated order to provide requisite context between graphical items, or it can be important that content provided by an editor is not re-ordered without his knowledge. A reading order is substantially a combination of left-to-right and top-to-bottom ordering, arranged to provide a first graphical item in the plurality of graphical items in a top-left-most position of a space (e.g., page) and a last graphical item in the plurality of graphical items in a bottom-right-most position of the space. In this manner, those graphical items in regions wholly to the right or below a particular region contain graphical items that occur in the order after those graphical items in the particular region.

The automatic page layout method of the present disclosure is based on recursive page division. Item geometry is not known but area percentages required for those items can be provided as input, or determined for example, based on relative numbers of characters of text found in particular graphical items. According to an example embodiment, a page can be divided accordingly, and graphical items are displayed later in their assigned regions. According to some embodiments, automatic page layout is accomplished by recursive partitioning. Some areas are further structured into columns (as in most newspapers), with items using an integer number of columns, which can be easily configured.

The input file to the automatic page layout method can be an extension of XML obtained by converting RSS feeds and/or Wiki formats, among others. Different outputs can be generated, such as PDF, LATEX and dvi.

When a sequence of graphical items is available for placement (e.g., received at client 128 shown in FIG. 1), decisions have to be made about how to partition the page. Many previous approaches for page layout with optimal fitting do not preserve the reading order established by the order of the graphical items (e.g., received order or indicated order). Readers are comfortable with layouts based on rows and columns, and the automatic page layout method of the present disclosure seeks to achieve a similar result. If several graphical items are to be placed on a page, the sequence of graphical items can be divided into groups of items and the page can be divided either vertically or horizontally, producing rows or columns where each group can be placed.

The optimal number of groups are chosen to partition the sequence of graphical items. If a sequence of M graphical items is received, the M graphical items can be divided into from one single group placed as a single row or column, to M independently placed groups having one item each. First, the items in each group are chosen. There are (M−1)!/(K−1)!/(M−K)! ways of dividing a sequence of M graphical items into K groups. Evaluating all grouping possibilities for optimum placement is unfeasible in most cases. Therefore, some reasonable way of dividing a sequence of graphical items into groups is chosen.

The size and position of the page region assigned to each group is chosen. The size has to take into account the amount of area needed by the group, which can be summed from the percentage of area recommendations that can accompany the received sequence of graphical items, or be determined therefrom. The position of the regions affects the reading order. Consecutive groups of graphical items to be placed into regions (and optionally areas and columnar sub-areas) can be distributed into these regions/areas/columns from left to right, assuring that reading order is respected. When rows are used, distributing the groups from the top row to the bottom row achieves the same effect.

Finally, a choice is made among different region placement possibilities. As a region can be divided into rows and/or columns, the best choice for placing a region corresponding to a particular group will reduce some error measure. A best possible placement can be achieved by reducing a cumulative error measure (e.g., the sum of individual error measures associated with each graphical item). One example measure of error is explained below.

The first step in determining an error measurement is to process and normalize each item area (e.g., the percentage of the total space occupied by an area associated with a particular graphical item). A graphical item can be comprised of an image and/or text. If the graphical item is an image, its error can be measured by the proportion between the region height and the image's expected height determined by its fixed aspect ratio based on the image's width across number of columns (c). If the graphical item is text, its error can be measured by the proportion between the normalized region area and the recommended area (which can be received with the graphical image).

One example error computation to implement the above-described error measure is provided below. The function Error (i, w, h, c) can be used to evaluate the error of placing item i in a region defined by w (width), h (height) and c (number of columns) is presented below.

```
function Error (i, w, h, c)
    aspectRatio = w / h
    if (aspectRatio < item_i.minAR OR aspectRatio > item_i.maxAR)
        return ∞
    if (item_j is a picture)
        if ( c < item_i.minCols OR c > item_i.maxCols)
            return ∞
        r * h / item_i.height
    else
        proportion = ( w * h ) / (pageWidth * pageHeight)
        r = (item_i.area) / proportion
    if ( r < 1.0)
        return 1.0 / r
    else
        return r
```

Where i indicates the graphical item number, w is area width, h is area height, c is the number of columns, minAR is a minimum aspect ratio, maxAR is a maximum aspect ration, and r is the error.

The error measure is used to describe how well placement of a graphical item uses the page, and the final automatic page layout tries to obtain the best possible placement by minimizing this error measure. The placement error of a single graphical item is a measure of how well it fits into its assigned area. Embodiments of the present disclosure are not limited to the above error measure computation, which can be measured in several other ways within the scope of this disclosure.

According to one or more embodiments of the present disclosure, the automatic page layout methodology is recursive and receives as parameter a sequence of graphical items defined by the interval [i, j], and the page defined by width, height, and number of columns. The output is a proposed page layout, along with the error of trying to put the graphical items inside the bounding space within a corresponding region and associated area. The method includes finding a sequence of region divisions that returns the smallest error. The recursion ends when i=j, which is the case of having just one graphical item for each region and/or area. One example function that implements the methodology of the present disclosure is presented below.

In this algorithm Ai represents the normalized area of an item i. Hash represents a hash table that is indexed by the algorithm parameters (i.e., each algorithm entrance is an index). For each index the following information is saved: error; the index kn where the interval [i j] should be cut; and the number of columns of the left side of the cut, for the case that a portion of the space page was split vertically. The reader will appreciate that break a sequence of items into groups and place these groups as rows/columns, we can apply the same strategy recursively on every row/column until each single item reaches its final position. Thus, the algorithm can be recursively implemented and return either the best possible placement or fail, indicating that placement was not possible.

```
function calc (i, j, w, h, c)
    if (i == j)
        return Error (i, w, h, c)
    if (Hash (i, j, c, h) exists))
        return Hash (i, j, c, h).mv
    mkn = 0
    mv = ∞
    // Test every horizontal cut
    for (kn = i; kn < j; kn++)
```

$$h' = h * \left(\sum_{k=i}^{kn} A_k\right) / \left(\sum_{k=i}^{j} A_k\right)$$

```
        error = calc (i, kn, c, w, h)
        if (error < mv)
```

-continued

```
        error = max (error, calc (kn + 1, j, c, w, h − h'))
        if (error < mv)
            mv = error
            mkn = kn
    if (my < ∞) // a solution was found
        Hash (i, j, c, h) = [mv, mkn]
    error = mv
    for (kc − 1; kc < c; kc++)
        w' = w*kc/c
        for (kn = i; kn < j; kn++)
            error = calc (i, kn, w', h)
            if (error < mv)
                error = max (error, calc (kn + 1, j, c − kc, w − w', h))
                if (error < mv)
                    mv = error
                    mkn = kn
                    mkc = kc
    if (mv < error)
        Hash (i, j, c, h) = [mv, mkn, mkc]
        return mv
    else
        return error
```

Figure 4:
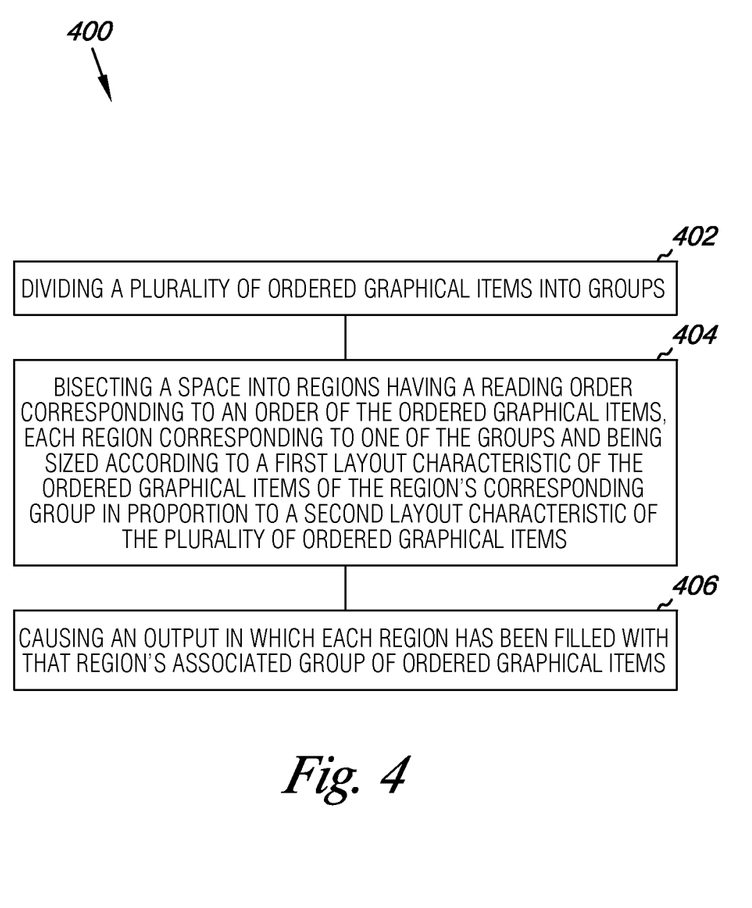
FIG. 4 is a flow chart illustrating an example of a method for automatic page layout according to an example of the present disclosure.

FIG. 4 is a flow chart illustrating an example of a method for automatic page layout according to an example of the present disclosure. The method 400 includes dividing a plurality of ordered graphical items into groups at 402. The method further includes bisecting a space into regions having a reading order corresponding to an order of the ordered graphical items, each region corresponding to one of the groups and being sized according to a first layout characteristic of the ordered graphical items of the region's corresponding group in proportion to a second layout characteristic of the plurality of ordered graphical items at 404. An output is caused in which each region has been filled with that region's associated group of ordered graphical items at 406.

Previous approaches on rectangular tiling generalize where polygons are tiled with rectangles having all the same dimensions, and where the perimeter of the rectangles is minimized. Such a generalization aims at reducing global measures of the tiling as the sum of the perimeters or the maximum aspect ratio. These works do not apply easily to document design as they do not take into account that the tiling has to correspond to a preferred reading order. For document design, several approaches based on genetic algorithms have been used, but these techniques may be costly if many documents are to be produced. More restricted problems like photo albums and maps have been explored; however, these do not seem suitable for the mass production of documents. Some previous approach are limited to placing items on a grid and/or use templates to evaluate page quality. The automatic page layout of the present disclosure does not required the use of templates.

The automatic page layout method and system of the present disclosure operates to partition a page into regions where content will be placed. As a consequence, it can be used to build photo albums as previous approaches, but may also allocate space for areas of text on a page, if a text graphical item is also received.

The automatic page layout method of the present disclosure has several advantages over previous approaches, including preservation of the reading order (e.g., a page area is divided proportionally among the items being placed), and substantially homogeneous text density. That is, space on a page can be allocated proportionally among the regions having graphical items that include text so as to achieve a substantially uniform density of text across the space that tends to be pleasing to a reader's eye. For example, the automatic page layout method of the present disclosure can recursively bisect space on a page into regions such that each display of text provides approximately N characters per linear horizontal distance and/or M rows of text per linear vertical distance. Moreover, graphical items can be rigid items (e.g., images) and flexible items (e.g., texts).

The automatic page layout can be easily adapted to include captions on images, author's names, and watermarks as any other graphical item. Further, the method can automatically adapt the text fonts (e.g., size) to fill its assigned area. Certain areas can be automatically resized to draw attention to the graphical items (e.g., news articles) that use more columns on the page. The automatic page layout method of the present disclosure can be adapted to perform a variety of page layout tasks, including photo albums, newspapers, and magazine covers and internal layout. Automatic page layout can be achieved for content obtained from the Web, RSS feeds, or print instructions.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Various examples of the system and method for collaborative information services have been described in detail with reference to the drawings, where like reference numerals represent like parts and assemblies throughout the several views. Reference to various examples does not limit the scope of the system and method for displaying advertisements, which is limited just by the scope of the claims attached hereto. Additionally, any examples set forth in this specification are not intended to be limiting and merely set forth some of the many possible examples for the claimed system and method for collaborative information services.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an embodiment," as used herein does not necessarily refer to the same embodiment, although it may.

In the foregoing Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for automatic page layout, comprising:
receiving a plurality of ordered graphical items;
dividing the plurality of ordered graphical items into groups;
bisecting a space into regions responsive to receiving the plurality of ordered graphical items, the regions having a reading order corresponding to an order of the ordered graphical items, each region corresponding to one of the groups and being sized according to a first layout characteristic of the plurality of ordered graphical items of the region's corresponding group in proportion to a second layout characteristic of the plurality of ordered graphical items; and
causing an output in which each region has been filled with that region's associated group of ordered graphical items.

2. The method according to claim 1, wherein bisecting a space into regions includes allocating the space proportionally among the regions having graphical items that include text so as to achieve a substantially homogeneous text density across the space.

3. The method according to claim 1, further comprising obtaining a recommended percentage of the space to be allocated to an area associated with one of the graphical items; and
wherein the first layout characteristic is a sum of the recommended percentage of the space to be allocated to the area associated with a quantity of graphical items.

4. The method according to claim 1, further comprising for each of a number of the regions, partitioning that region into areas each associated with one of the graphical items of the group corresponding to that region.

5. The method according to claim 1, further comprising causing a display of the plurality of graphical items in which each one of the graphical items is shown a respective associated area, wherein each graphical item includes text and/or an image.

6. The method according to claim 4, further comprising sizing an area associated with a graphical item that includes an image to have an aspect ratio greater than a predefined aspect ratio of the image.

7. The method according to claim 6, further comprising:
computing an image area error measure for an area associated with a graphical item that includes an image as a proportion between a height of the area and a height of the image determined from the predefined aspect ratio of the image having a width equal to the width of the area;
computing a text area error measure for an area associated with a graphical item that includes text as a proportion between a recommended percentage of the space to be allocated to the area received with the associated graphical item and an actual percentage of the space for the area; and
selecting a particular arrangement of regions and sizes thereof that minimizes the maximum of the image and text area error measures.

8. The method according to claim 1, wherein bisecting the space into regions includes recursively bisecting the space, the method further comprising prohibiting bisection where a resulting region would violate specified minimum and/or maximum aspect ratios.

9. The method according to claim 1, wherein bisecting the space into regions includes recursively bisecting the space, and wherein dividing the plurality of ordered graphical items into groups includes dividing the plurality of ordered graphical items into groups without any intentional delay with bisecting the space, the method further comprising using vertical or horizontal bisection of the space and/or a region to form two adjacent regions.

10. The method according to claim 1, wherein the reading order is substantially a combination of left-to-right and top-to-bottom ordering, arranged to provide:
a first graphical item in the plurality of graphical items in a top-left-most position;
a last graphical item in the plurality of graphical items in a bottom-right-most position; and
those graphical items in regions wholly to the right or below a particular region contain graphical items that occur in the order after those graphical items in the particular region.

11. The method according to claim 1, further comprising arranging text of a graphical item within an associated area into a heading sub-area and an integer number of columns therebelow.

12. A non-transitory computer-readable medium having computer-readable instructions stored thereon that, if executed by one or more processors, cause the one or more processors to:
receive a plurality of ordered graphical items;
divide the plurality of ordered graphical items into groups;
bisect a space into regions responsive to receipt of the plurality of ordered graphical items, the regions having a reading order corresponding to an order of the ordered graphical items, each region corresponding to one of the groups and being sized according to a first layout characteristic of the plurality of ordered graphical items of the region's corresponding group in proportion to a second layout characteristic of the plurality of ordered graphical items; and
cause an output in which each region has been filled with that region's associated group of ordered graphical items.

13. The non-transitory computer-readable medium of claim 12, further including computer-readable instructions stored thereon that are executed by the processor to, for each of a number of the regions, partition that region into areas each associated with one of the graphical items of the group corresponding to that region.

14. The non-transitory computer-readable medium of claim 12, further including computer-readable instructions stored thereon that are executed by the processor to bisect the space into regions and, without intentional delay, divide the plurality of graphical items into groups.

15. The non-transitory computer-readable medium of claim 12, further including computer-readable instructions stored thereon that are executed by the processor to:
compute an image area error measure for an area associated with a graphical item that includes an image as a proportion between a height of the area and a height of the image determined from the predefined aspect ratio of the image having a width equal to the width of the area;
compute a text area error measure for an area associated with a graphical item that includes text as a proportion between a recommended percentage of the space to be allocated to the area received with the associated graphical item and an actual percentage of the space for the area; and select a particular arrangement of regions and sizes thereof that minimizes the maximum of the image and text area error measures.

16. The non-transitory computer-readable medium of claim 14, further including computer-readable instructions stored thereon that are executed by the processor to recursively bisect the space into regions, computing a total error for each bisection iteration, the total area measure comprising a sum of an image area error measure and/or a text area measures for each area.

17. The non-transitory computer-readable medium of claim 15, further including computer-readable instructions stored thereon that are executed by the processor to maintain the reading order substantially being a combination of left-to-right and top-to-bottom ordering with a first ordered graphical item located in a top-left-most position, and a last ordered graphical item located in a bottom-right-most position, wherein those graphical items in regions wholly to the right or below a particular region contain graphical items that occur in the order after those graphical items in the particular region.

18. A computing system, comprising:
a computing device having at least one processor;
a production device communicatively coupled to the computing device; and
a non-transitory computer-readable medium having computer-readable instructions stored thereon that, if executed by the at least one processor, cause the at least one processor to:
receive a plurality of ordered graphical items;
divide the plurality of ordered graphical items into groups;
bisect a space into regions responsive to receipt of the plurality of ordered graphical items, the regions having a reading order corresponding to an order of the ordered graphical items, each region corresponding to one of the groups and being sized according to a first layout characteristic of the plurality of ordered graphical items of the region's corresponding group in proportion to a second layout characteristic of the plurality of ordered graphical items; and
cause an output in which each region has been filled with that region's associated group of ordered graphical items.

19. The computing system of claim 18, wherein the non-transitory computer-readable medium includes computer-readable instructions stored thereon that, if executed by the at least one processor, cause the at least one processor to, for each of a number of the regions, partition that region into areas each associated with a one of the graphical items of the group corresponding to that region.

20. The computing system of claim 18, wherein the production device is an electronic display, the order is an order in which the plurality of graphical items are received, and the non-transitory computer-readable medium includes computer-readable instructions stored thereon that, if executed by the at least one processor, cause the at least one processor to display the plurality of graphical items on the display in the associated areas, each graphical item including text and/or an image.

* * * * *